United States Patent [19]

Cohen

[11] 4,079,264

[45] Mar. 14, 1978

[54] WIND OR WATER OPERATED POWER PLANT

[76] Inventor: Nathan Cohen, 19 Olive, Great Neck, N.Y. 11022

[21] Appl. No.: 682,647

[22] Filed: May 3, 1976

[51] Int. Cl.² .............................................. F03D 9/00
[52] U.S. Cl. ........................................ 290/55; 290/44
[58] Field of Search ..................... 290/43, 44, 54, 55; 415/2, 3, 4

[56] References Cited

U.S. PATENT DOCUMENTS 3,883,750    5/1975    Uzzell, Jr. ............................... 290/55

FOREIGN PATENT DOCUMENTS 459,789    10/1950    Italy ........................................ 415/2
561,435    5/1944    United Kingdom ...................... 415/4

Primary Examiner—Robert K. Schaefer
Assistant Examiner—Eugene S. Indyk
Attorney, Agent, or Firm—Kurt Kelman

[57] ABSTRACT

A fluid operated power generating system comprises a power producing unit or an array of such units adapted to be positioned in a flow of fluid. Each unit includes end walls configured to cause fluid to flow therealong in a rectilinear path and has a passage leading therethrough from a lateral inlet to a lateral outlet. The through passage defines a constricted zone causing the velocity of the fluid passing through the passage to increase and the pressure of the fluid to drop in the constricted zone. A rotary device is in communication with the constricted zone and the pressure differential in the zone rotates the device.

8 Claims, 26 Drawing Figures

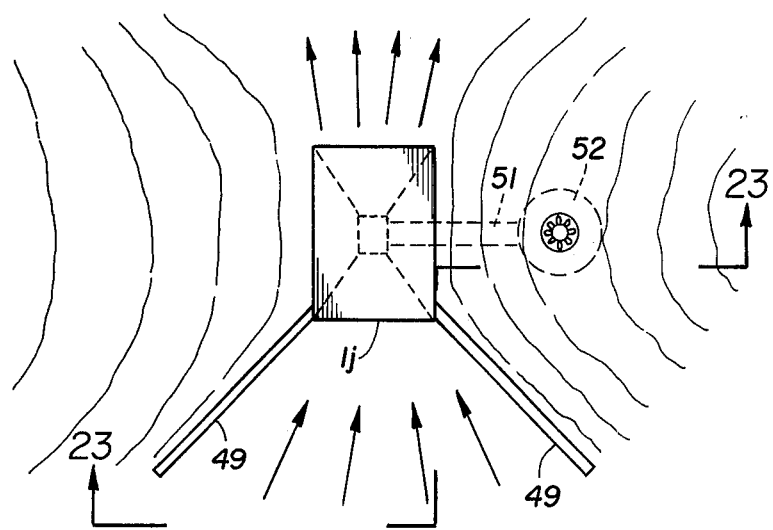
FIG.22
FIG.23
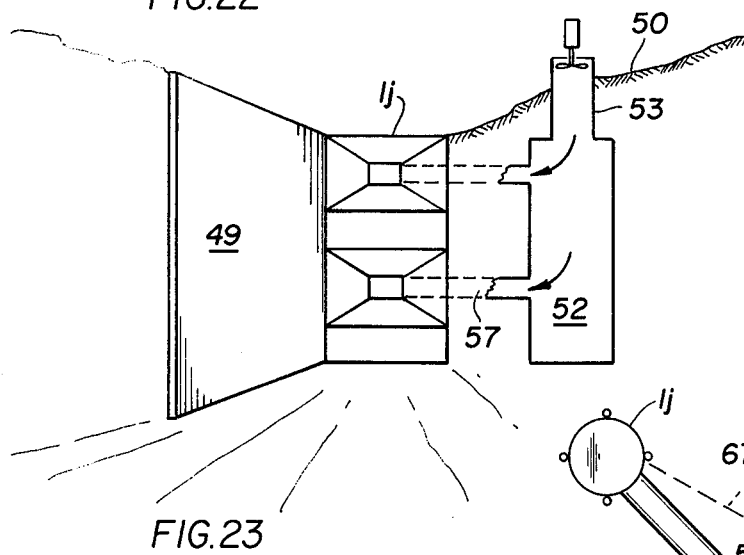
FIG.25
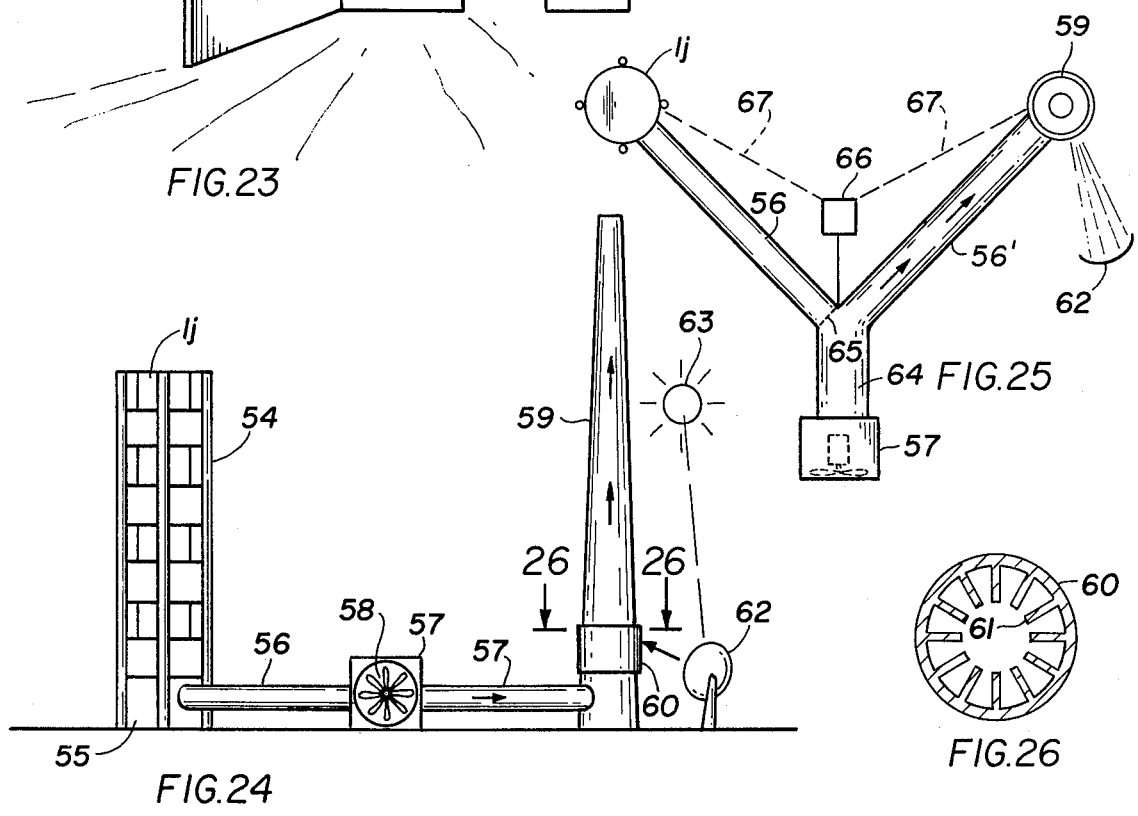
FIG.24
FIG.26

WIND OR WATER OPERATED POWER PLANT

The present invention relates to improvements in fluid operated power generating systems.

Wind and water power to produce energy have become of great importance, and much effort has been made within recent years to improve the efficiency of such systems to make them economically feasible. The literature is rich with a great variety of proposals. Merely by way of example reference is made to the report on "Wind Energy Conversion Systems", issued in December 1973 by the NTIS of the U.S. Department of Commerce and summarizing the workshop proceedings of a NASA conference held in Washington, D. C., June 11–13, 1973. Also of interest is an article in the National Geographic of December 1975 on "Can We Harness the Wind?" by Roger Hamilton. In the Mar. 1, 1976 issue of "Aviation Week & Space Technology", there is an article on "Vertical-Vortex Wind Turbine Proposed". Broad suggestions have been made to build tall vertical wind machines utilizing the energy from solar-heated air rushing through them.

All of these proposals use generally known aero- or hydro- dynamic principles but seek to apply them in a manner to make the conversion of the kinetic energy of a flowing fluid into electrical energy economically feasible.

It is the primary object of this invention to provide systems which are simple and relatively cheap to build and which provide a variety of means depending on conditions designed to improve the efficiency of fluid operated power generating systems to the point where wind or lower-energy water streams can be used in a more economic production of electric power.

Fundamentally, the present invention is based on a power producing unit adapted to be positioned in a flow of fluid, which unit comprises an end wall configurated to cause the fluid flow to pass therealong in a rectilinear path, a through passage for the fluid flow in the unit, the passage having an inlet and an outlet for the fluid flowing therethrough, a constricted zone in the passage, which causes the velocity of the fluid to increase and its pressure to drop, and a rotary device having a hub and blades in communcation with this zone. The flowing fluid turns the rotary device and the resultant power of the rotating hub increases with the cube of the fluid flow velocity. The hub may be suitably connected in any known manner to an electric power generator, for example, to convert the power into electric energy.

While the fluid operated power generating system of this invention will be described herein primarily in connection with wind power, those skilled in the art of aero dynamics and hydrodynamics will readily be able to adapt at least some of the described systems to use with liquids, such as river currents, tides and such oceanic phenomena as the Gulf Stream, the only essential requirement being the presence of a flow or stream of fluid into which power producing units are placed.

Outstanding increases in efficiency are obtained in accordance with this invention by using a coordinated array of such power producing units combined to power a single rotary device. The above and other objects, advantages and features of the invention will become more apparent from the following detailed description of certain now preferred embodiments thereof, taken in conjunction with the schematic drawing diagrammatically illustrating the principles of the present invention and wherein FIG. 1 is a vertical cross section schematically showing one embodiment of a power producing unit according to this invention;

FIG. 22 is a top view and FIG. 23 is a side view of another embodiment; and

FIG. 24 is a side view and FIG. 25 is a top view of a further embodiment, FIG. 26 showing a detail thereof.

Figure 1:
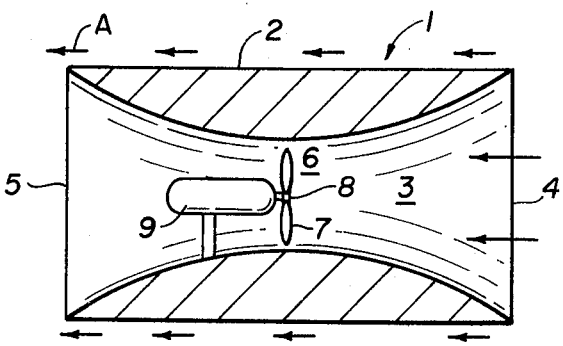
Figure 2:
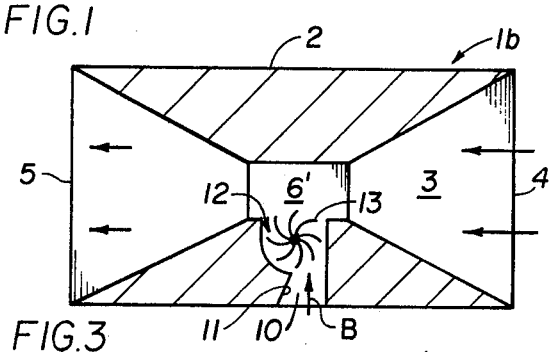
FIG. 2 is a like view of a modificaton of this embodiment.

Referring now to the drawing, FIGS. 1 and 2 represent a very simple embodiment of a power producing unit according to the invention, this embodiment constituting an improvement over wind energy power plant of U.S. Pat. No. 3,883,750, dated May 13, 1975. This patent discloses a wind-powered energy producing device comprising a Venturi chamber mounted for rotation on a support. A rudder orients the openings of the chamber into the wind and a fan is positioned within the throat of the chamber to be acted upon by the wind entering the chamber. The fan is operatively connected to an energy producing device, such as a generator. The peripheral wall of the Venturi chamber is centrally constricted, thus causing the wind flow to pass therealong turbulently. The resultant wind turbulence at the chamber outlet causes blockages which considerably reduce the efficiency of this device and cut down the power produced by the rotating fan.

In contrast to this known device, the power producing unit 1 shown in FIG. 1 comprises end wall 12 configurated to cause the fluid, such as wind, to pass therealong in a rectilinear path, as shown by arrows A. The unit has a through passage 3 for the wind flow from inlet 4 to outlet 5. The illustrated unit may be a parallelopiped box with two parallel flat end walls 2 or a tube. The inside of the peripheral wall thickens from both ends towards the center to define constricted zone 6 in passage 3. Of course, it would be equally possible to provide a peripheral wall or cowling of the desired configuration to assure rectilinear fluid flow therealong and to mount thereon inner wall portions to define the Venturi passage 3, the resultant chamber between the peripheral wall and the inner wall portions housing the generator or other components, if desired. A rotary device having hub 8 and blades 7 is mounted in constricted zone 6.

As is known, the fluid velocity will increase as the fluid passes through converging portion 6, whereas the pressure will drop. At throat 6, the velocity of the fluid stream is at its maximum and the pressure at its minimum, creating there a semi vacuum. The acceleration of the fluid flow is caused by a force due to the pressure difference and this force turns fan 7, 8 the power of rotating hub 8 being increased by the cube of the velocity, the theoretical power obtainable from the wind being calculated as $$P = 0.93R^2 p V^3$$

wherein $P$ is the power, $R$ is the radius of the blade, $p$ is the air density, and $V$ is the wind velocity.

The rotating hub of the fan is connected by a suitable gearing to electric generator 9 which is shown mounted in passage 3 but which may readily be placed into a housing between the peripheral wall and the inner wall of the unit, or any other location, simply by providing a suitable transmission between hub 8 and the generator input shaft.

It will be understood that smooth wind flow is assured at outlet 5 of the unit, thus greatly increasing the efficiency of the device and increasing its power output.

FIG. 2 shows an obvious modification of the embodiment of FIG. 1, differing therefrom only by providing rectilinear instead of curvilinear inner wall portions forming the Venturi passage of unit 1a.

The above and at least some of the following fluid operated power generating units may be useful in converting not only wind energy but also the kinetic energy of flowing water into electrical energy, a suitable combination of such devices being capable of converting even the relatively low velocity of such currents as the Gulf Stream into a useful source of electric energy.

Figure 3:
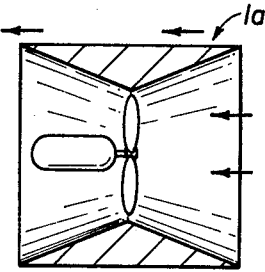
FIG. 3 is also a vertical cross sectional view schematically showing another embodiment of the power producing unit.

Power producing unit 1b of FIG. 3 shows an improved design over simple units 1 and 1a. This unit, too, has a straight peripheral wall 2, the flowing fluid entering passage 3 at inlet 4 and leaving at outlet 5, the inlet and outlet being in communication with the ambient fluid, as in the first-described embodiments. In unit 1b, high-velocity, low-pressure zone 6' is elongated along the axis of passage 3 and is in communication with conduit 10 leading at an angle from zone 6' through the peripheral wall to the ambient fluid. In the illustrated embodiment, conduit 10 leads from zone 6' at a right angle thereto. In view of the fact that a pressure considerably lower than the ambient pressure prevails in zone 6', fluid is sucked into conduit 10 in the direction of arrow B, producing a rapid flow of fluid in this conduit. The velocity of the sucked-in fluid is further increased by making the walls of conduit 10 converging, as indicated at 11, thus creating an additional Venturi effect. Beyond the throat of conduit 10, its diameter is increased to form chamber 12 housing paddle wheel impeller 13. The impeller is turned by the flowing fluid, the pressure differential between the fluid at the inlet to conduit 10 and in chamber 12 being considerable so as to assure very effective power output. The power of the rotating hub of impeller 13 may again be used in any desired and well known manner to operate an electric power generator.

FIGS. 4 to 8 illustrate schematically various useful arrangement for assuring a smooth fluid flow and increasing the pressure differential between the incoming fluid and the fluid in the zone wherein the rotary device for producing power is placed, these two factors determining the efficiency of a fluid operated power generating system for any given radius of the blades of the rotary device. Primarily for reasons of economy, the latter has practical limitations.

Figure 4:
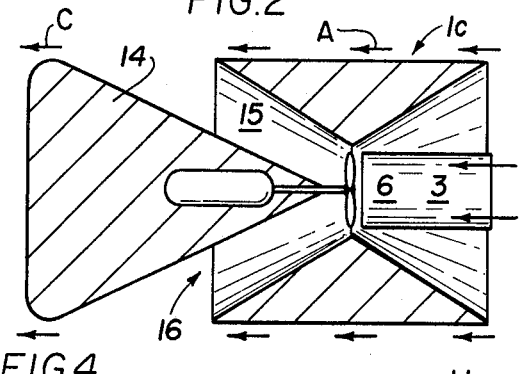

FIG. 4 shows unit 1c wherein unit 1a is modified by placing a pyramidal or conical body 14 into the output side of fluid flow passage 3 beyond throat 6. Body 14 is coaxially arranged in passage 3, the walls of body 14 and the inner wall portions of unit 1c diverging to define therebetween outwardly flaring fluid flow channel 15. The pressure of the fluid at outlet 16 of channel 15 will be lower than the pressure of the ambient fluid flowing rectilinearly along the peripheral wall of unit 1c, causing the fluid flowing in the direction of arrows A to pull along the fluid coming out of channel 15 in the direction of arrows C, thus increasing the rapidity of flow removal from the unit and further lowering the fluid pressure in zone 6. Thus, unit 1c is considerably more efficient than unit 1a.

Figure 5:
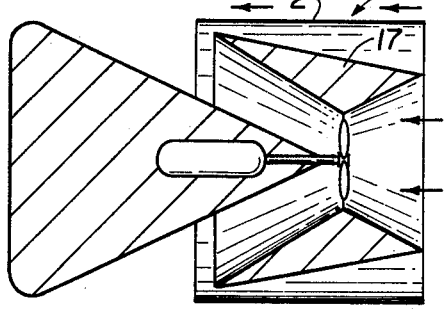

Unit 1d of FIG. 5 is a modification of unit 1c requiring little further description. In this modified unit, peripheral wall 2 is constituted by a cowling and the Venturi effect if produced by placing a pair of bodies 17 into the fluid flow passage to provide the required constricted zone.

Figure 6:
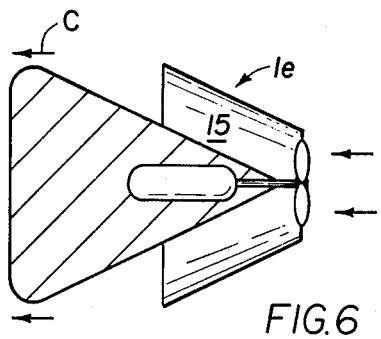
FIGS. 4 to 8 are diagrammatic cross sections of various embodiments of fluid flow channeling means for use with such units.

Unit 1e of FIG. 6 differs from unit 1c only by the arrangement of the constricted zone at the inlet of the unit. In other words, the pressure differential is produced solely by channel 15 and the pull in the direction of arrows C produced by the fluid flow along the peripheral wall of the unit.

Figure 7:
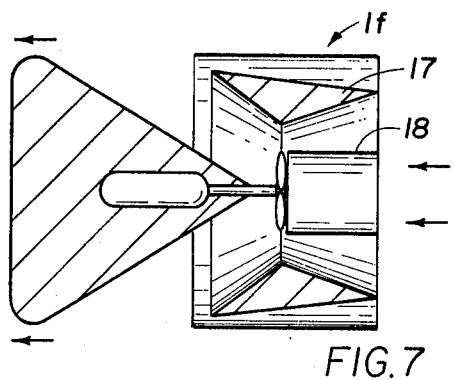

Unit 1f of FIG. 7 differs from unit 1d only by mounting a coaxial tube 18 of the same diameter as the diameter of the blades of the rotary device in the input side of the fluid flow passage. Thus, the inner wall portions of body 17 converge with the wall of tube 18 to produce Venturi at the rotary device.

Figure 8:
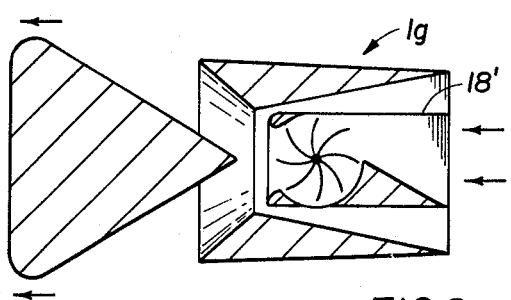

FIG. 8 finally, shows modified unit 1g which has substantially the same structure as unit 1f, except that a further Venturi is formed within tube 18' and, immediately beyond the throat of the Venturi, a chamber is formed in the tube for housing a paddle wheel impeller. The efficiency of this unit is very high, considering a triple Venturi arrangement which greatly increases the pressure differential.

Figure 9:
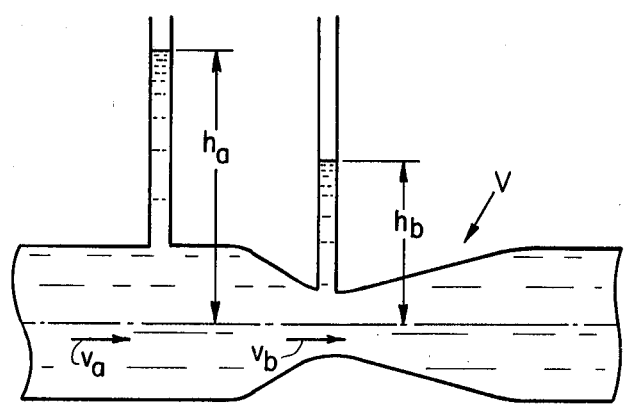
FIG. 9 is a diagram illustrating the scientific principles whereon the power producing unit of the invention is based.

The fundamental principle on which all these fluid operated power generating systems work is diagrammatically illustrated in FIG. 9. Fluids moving at higher velocities than fluids at lower velocities have lower static heads. This known principle is shown in the Venturi tube V of FIG. 9 wherein fluid flow $v_a v_b$ have corresponding static pressure heads $h_a$ and $h_b$. It also is a basic principle of physics that an object placed into a fluid flow or stream produces an obstruction, with a measurable pressure differential developing between the upstream and downstream surfaces of the obstructing object. By properly shaping, channeling and streamlining the fluid flow, the pressure differentials can be so increased as to develop useful power from a rotary device operated by the pressure differential.

Relatively simple power plants based on the above principles and designed for efficient use thereof have been illustrated and described hereinabove while the following embodiments show some further structural features designed further to increase the power output of fluid operated power generating systems.

Figure 10:
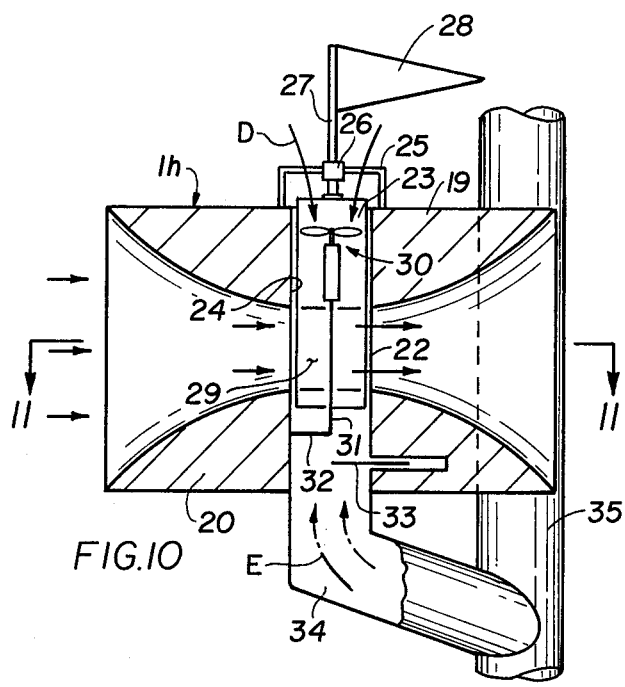
FIG. 10 is a vertical cross section schematically illustrating a further embodiment of a power producing unit.
Figure 11:
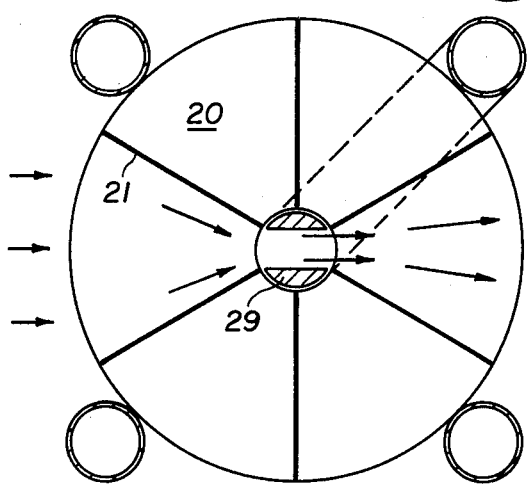
FIG. 11 is a section along line II—II of FIG. 10.

FIGS. 10 and 11 show unit 1h which is a modification of unit 1 of FIG. 1 and is adapted to produce power from wind. Unit 1h is constituted by a cylindrical box consisting of two like halves 19, 20 which are spherical segments interconnected by vertical radial walls 21. The inner spherical walls converge to form constricted zone 22 at the center of unit 1h, the radial walls falling short of reaching the vertical axis of the unit to produce an axially extending throat. An array of six equidistantly spaced radial walls are shown in the illustrated embodiment to produce three diametrically aligned Venturi passages in unit 1h. It will be obvious to those skilled in the art that more such passages may be produced by increasing the number of separating walls 21.

The plurality of passages are provided in unit 1h to adapt it for use to winds blowing in different directions, a respective one of the wind flow passages being automatically aligned with the prevailing wind direction in the following manner:

Coaxially aligned cylindrical passages 24 in registry with cylindrical throat 22 are bored into unit sections 19 and 20 for housing tubular casing 23. The casing is open on top and bottom, the open top communicating with the ambient atmosphere, as shown by arrows D. Upper unit section 19 supports support frame including axial bearing 26 wherein vertical support shaft 27 is journaled for free rotation, shaft 27 carrying tubular casing 23 for rotation about the axis of the unit. Wind vane 28 is affixed to the top of shaft 27 to turn the same in the direction of the wind. At its lower end, tubular casing is formed with a pair of channel walls 29, 29 which define a passage therebetween for the wind to pass in the direction of the arrows shown in FIG. 11. This narrow passage in throat 22 of the unit will be aligned with a respective diametrical wind flow passage of unit 1h in accordance with the prevailing wind direction. In this manner, the power plant will operate in whatever direction the wind blows.

As has been explained hereinabove, the pressure differential produced by constricted zone 22 will provide a semi vacuum, thus sucking ambient air into tubular casing 23 in the direction of arrows D. The tubular casing houses rotary device 30 which will thus be turned to produce power in the indicated manner. As schematically shown, rotary device-power generator assembly 30 is mounted on shaft 31 passing coaxially through throat 22 so as not to interfere with the turning of channel walls 29, 29, shaft 31 being mounted on lower unit section 20 by means of bracket 32.

The lower section 20 of unit 1h is also shown to carry a shut-off valve 33. In a first mode of operation of unit 1h, the shut-off valve is closed so as to prevent access of fluid flow. In this mode of operation, wind will supply flow horizontally from left to right, as shown by the horizontal arrows in FIGS. 10, ambient air will be sucked towards rotary device 30 from above to turn the device, and the exhausted air will exit at the right.

Figure 12:
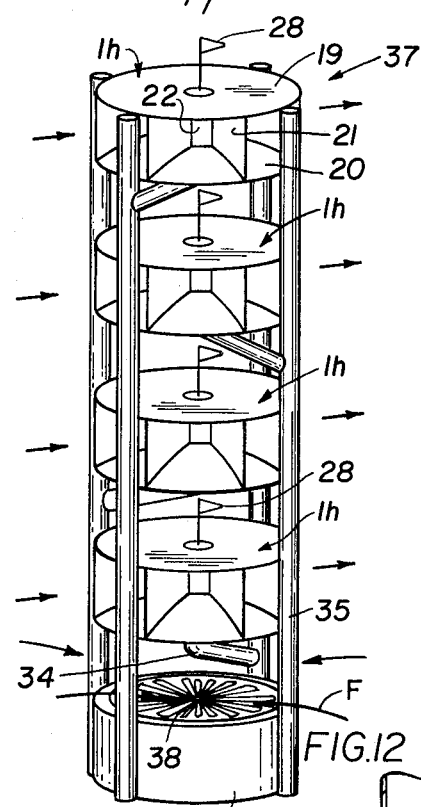
FIG. 12 shows a vertical array of power producing units according to FIG. 10.
Figure 13:
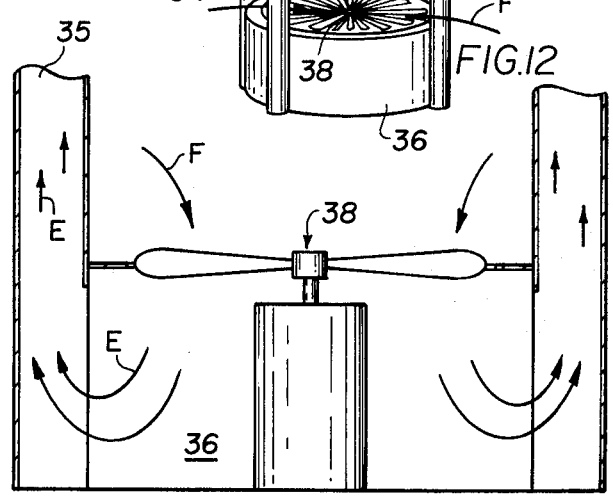
FIG. 13 is an enlarged side view of the bottom chamber of the array of FIG. 12.

As shown in FIGS. 12 and 13, an axially aligned array of units 1h may be connected in series to multiply the power obtained by the same wind. In this mode of operation, rotary device-generator 30 is not used and valve 33 is opened to place throat 22 of the unit in communication with duct 34 which opens into clyindrical passage 24 in lower unit section 20. The other end of duct 34 opens into vertical fluid conduit 35 which leads to chamber 36 at the bottom of the array of units 1h.

The tower 37 illustrated in FIG. 12 comprises bottom plenum 36 and a vertical array of four units 1h, each unit being connected to a respective vertical conduit 35, all conduits leading into chamber 36, as indicated in FIG. 13. A single rotary device-generator assembly 38 is mounted on chamber 36 and is operated by the combined output of all units 1h in the following manner, it being understood that any suitable number of such units may be stacked:

The partial vacuum in throat 22 of each unit 1h will cause air to be sucked into the throat through bore 24, duct 34 and conduit 35, as shown by arrows E, and will thus produce a powerful partial vacuum in chamber 36. The chamber being open to the atmosphere on top, the vacuum will suck in the ambient air, as shown by arrows F, to rotate the rotary device in the chamber and produce a multiple of the power from the same wind source as could be produced by a single unit.

This arrangement is not only highly efficient in converting wind into electrical energy but has the added advantage of maintaining the rotary device-generator assembly well protected at the bottom of tower 37. Cycle control and power developed may be regulated by various throttling and disconnecting devices that those skilled in the art may devise.

Figure 14:
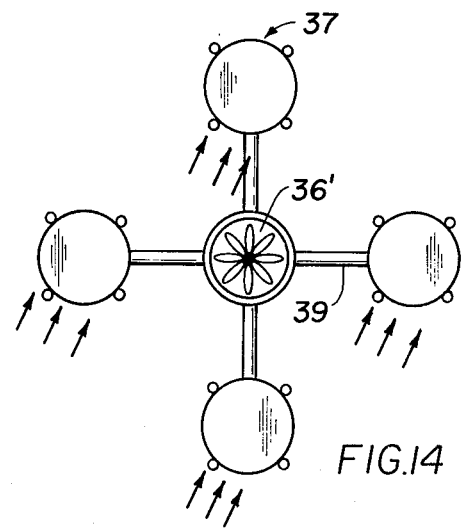
FIG. 14 is a schematic top view of four arrays according to FIG. 12 combined into a single power plant.

As indicated in FIG. 14, the power output may be further multiplied by interconnecting a plurality of towers 37. In this arrangement, the bottom chamber of each tower, which contains a powerful partial vacuum, is connected by radial ducts 39 to central chamber 36' housing the rotary device generator assembly. The vacuum in chamber 36' will be four times as powerful in the illustrated arrangement than the vacuum in each individual chamber 36.

It will be obvious from a consideration of the embodiments illustrated in FIGS. 10 to 14 that the fundamental principles of the present invention may be modified in a variety of ways to adapt the system to different wind conditions and power requirement, thus providing not only a highly efficient but also a very flexible power plant.

Figure 15:
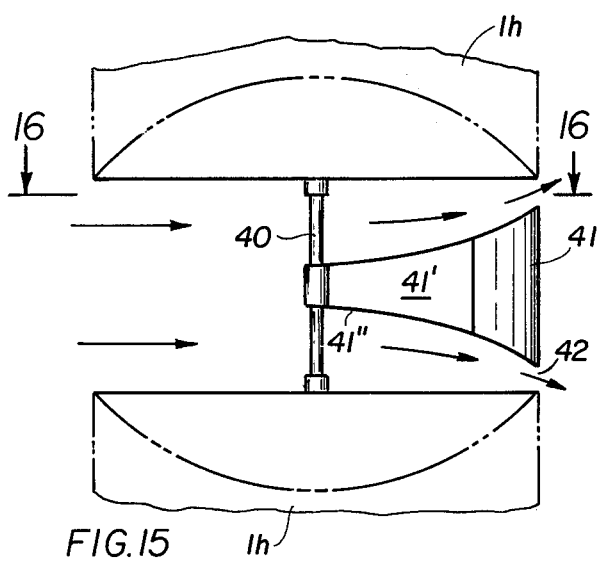
FIG. 15 is an enlarged side view of a modified wind vane used on the tower of FIG. 12.
Figure 16:
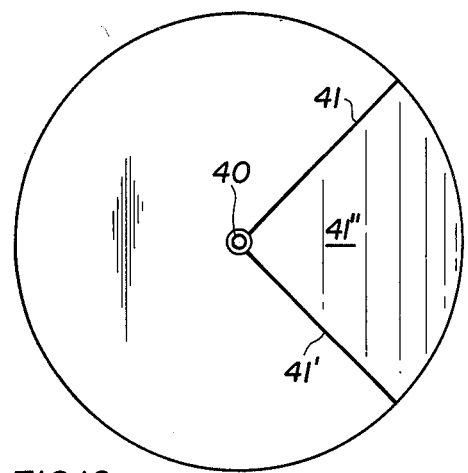
FIG. 16 is a section along line 16—16 of FIG. 15.

FIGS. 15 and 16 are enlarged views of a modified wind vane used instead of vane 28 in FIG. 12, showing a modified means for directing the through passage in the direction of the prevailing wind. Instead of using vanes 28 to turn channel walls 21 in the desired radial direction, there is provided shaft 40 affixed to the channel walls and extending in the axis of the unit. Three-dimensional body 41 is keyed to shaft 40 and has upstream walls 41' facing the incoming wind. As shown in FIG. 16, body 41 is of sector-shaped transverse cross section so that the incoming wind will turn body 41 about the axis of the unit, turning shaft 40 and channel walls 29 with it so as to orient the channel in the direction of the wind.

As also shown in the drawing, body 41 has symmetrically outwardly flaring end walls 41" to define annular throat 42 between body 41 and adjacent channel walls 29. This produces a double Venturi in the unit and thus increases its efficiency on the basis of the principles outlined hereinabove, i.e., the pressure in the center of the unit is further lowered, thus increasing the pressure differential of which the power output is a direct function.

Figure 17:
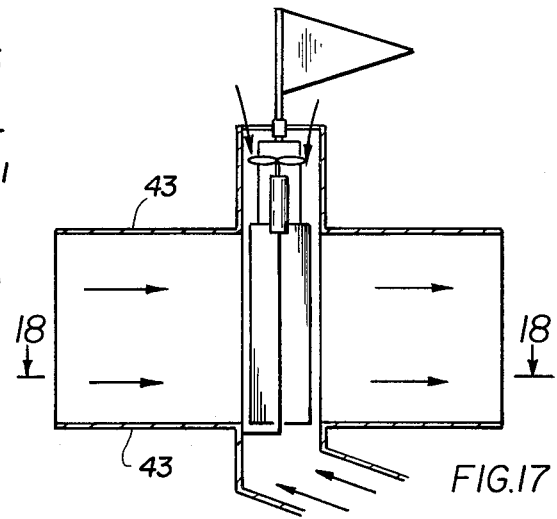
FIG. 17 is similar to FIG. 15, showing a different embodiment.
Figure 18:
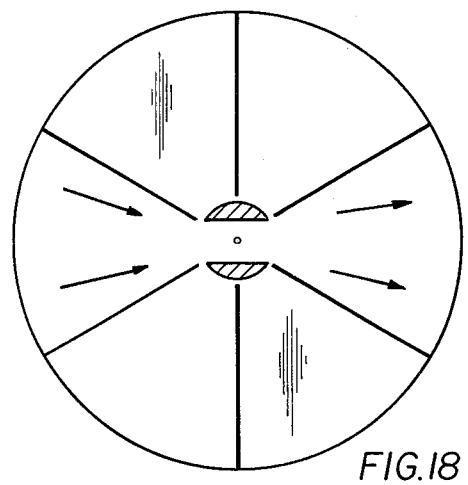
FIG. 18 is a section along line 18—18 of FIG. 17.

FIGS. 17 and 18 show a modification of unit 1h, differing therefrom only by making the inner wall portions 43, 43 which define the central throat, flat instead of spherical. In this modified embodiment, the Venturi action is obtained solely by the converging radial walls.

Since the units of FIGS. 15 to 18 operate like unit 1h, except for differing efficiencies, a further description of the structure and operation are not believed to be required.

Figure 19:
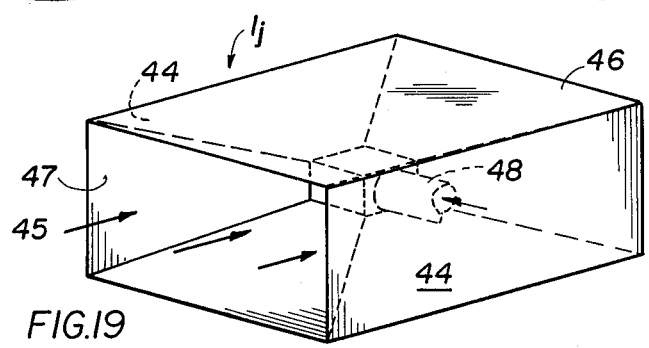
FIG. 19 is a perspective view of yet another embodiment of a power producing unit.
Figure 20:
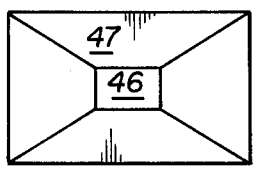
FIG. 20 is an end view of this embodiment.
Figure 21:
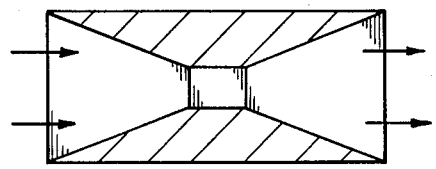
FIG. 21 is a cross sectional view of this embodiment.

In certain geographical locations, such as seashores, canyons and gulleys, wind conditions may be considered as substantially constant in magnitude as well as direction. In such situations, stationary power plant units may be used, which are oriented in the direction of the prevailing wind at the time of installation. FIGS. 19 to 21 show one embodiment of such a stationary unit 1j. This unit is constituted by a parallelepiped box having two flat end walls 44, 44 wherebetween there are defined inlet 45 and outlet 46 in alignment therewith. A central constricted zone 46 is formed by a series of converging walls 47 to provide a central low-pressure zone in communication with laterally extending duct 48 extending at right angle from zone 46 in relation to the direction of fluid flow. This duct is in communication with the ambient air which is sucked into the duct and a rotary device (not shown) is mounted in the duct for operation by the ensuing flow of air.

FIGS. 22 and 23 show a multiplex system making use of a series of stacked units 1j, two such units being shown in the illustrated embodiment. This arrangement is designed to take maximum advantage of the topography, the power plant being built next to the side of mountain 50. Baffles or deflecting walls 49 are arranged in front of the stacked units to direct the prevailing wind blowing along the mountainside into the units and, similarly to the arrangement of FIG. 12, ducts 51 lead from the low-pressure center zone of each unit 1j at a right angle to the direction of the wind flow into chamber 52 which is an underground installation sunk into mountain 50. This chamber has a chimney 53 in communication with the ambient atmosphere so that the low pressure in chamber 52 sucks in the air through the chimney which holds the rotary device-generator assembly.

In the power plant of FIGS. 24 to 26, a vertical array of unit 1j is stacked in a manner similar to that of FIG. 12 vertical columns 54 being in communication with the low-pressure centers of each unit in a like manner. Bottom chamber 55 of this installation is evacuated in the same manner as chamber 36 but, instead of placing the rotary device-generator assembly into this chamber, duct 56 leads therefrom into closed housing 57 for power assembly 58. The powerfully low pressure in chamber 57, which powers the rotary device in the housing, is further connected to the atmosphere by means of duct 57 and chimney 59.

As shown in FIGS. 24 and 26, a lower portion 60 of chimney 59 includes a heat exchange arrangement including an array of radial fins 61. Parobolic mirror 62 concentrates the heat radiation coming from sun 63 on this lower portion.60 to heat the air pressure therethrough, thus causing the air to rise more rapidly through the chimney and further reducing the pressure in housing 57. Clearly, the multiple low pressure sources provided by stacked units 1j and acting in unison upon the chamber defined by housing 58, combined with the further evacuation provided by the heated air rising in chimney 59, provides a highly efficient power plant.

As shown in FIG. 25, common duct 64 connects housing 57 to the bottom chamber of the tower constituted by unit 1j and to the lower portion of chimney 59 by ducts 56 and 57 which branch off common duct 64 in a Y-formation. Flap valve 65 is mounted at the intersection of ducts 56, 57 and 64 so as to place duct 64 and housing 57 selectively into communication with either duct 56 or duct 57, or with both ducts when the flap valve is centered between its end positions. A control 66 operates the valve in response to the air pressures prevailing in chamber 55 and lower portion 60 of the chimney, pressure sensors being mounted there and connected to control 66 by lines 67.

When valve 65 is in the end position shown in FIG. 25, chamber 55 is shut off from housing 57, this position being responsive to ambient pressure in chamber 55, due to the absence of wind. During such a time, the power plant would still operate if the sun shone since the heated air rising in chimney 59 would evacuate housing 57, thus producing the desired pressure differential.

It will be obvious from the above description of various embodiments that a great variety of arrangements may be used and interchanged, the description being limited primarily to the aero- or hydrodynamic principles involved in the illustrated structures since the mountings of the walls of the power conversion units, their specific configuration and the combination, as well as the nature and mounting of the rotary device-generator assemblies are all obvious to those skilled in the art. All modifications and variations within the scope of the appended claims are accordingly understood to be encompassed thereby.

What I claim is:

1. A fluid operated power generating system comprising a plurality of vertically arrayed power producing units adapted to be positioned in a flow of fluid, each of the units having a vertical axis and including end wall means configurated to cause fluid to flow therealong in a rectilinear path and comprising bores coaxial with the aixs, each unit defining a through passage therethrough leading from a lateral inlet for the fluid to the lateral outlet for the fluid between the end wall means, the through passage defining a constricted zone positioned centrally between the inlet and outlet and having an axis substantially perpendicular to the axis of the unit; the constricted zone causing the velocity of the fluid passing through the passage to increase and the pressure of the fluid to drop in the constricted zone, convex inner wall portions converging towards said zone to define the passage and the constricted zone, pairs of vertical radial walls extending between the inner wall portions, pairs of diametrically aligned radial walls defining the through passage therebetween, the radial walls extending from the inlet and outlet, respectively, to the constricted central zone, the passage tapering inwardly from the inlet and outlet towards said zone, the zone being in communication with one of the bores, the bore with which the zone is in communication being in communication with the conduit means, each unit being mounted for rotation about the vertical axis thereof, means mounted in the other bore and responsive to the prevailing fluid flow direction for rotating the unit above the vertical axis in said direction whereby a respective one of the pairs of diametrically aligned radial walls defines an operative through passage for the fluid flow, the units being arrayed coaxially, a chamber at the bottom of the arrayed units, and a rotary device having a hub and blades mounted in the chamber, and conduit means placing the constricted zone of each unit in communication with the chamber whereby the pressure differential in the zone rotates the device.

2. The fluid operated power generating system of claim 1, wherein the end wall means consists of two flat horizontal end walls substantially parallel to each other.

3. The fluid operated power generating system of claim 2, wherein the inner wall portions are spherical.

4. The fluid operated power generating system of claim 2, wherein the inner wall portions are pyramidal.

5. The fluid operated power generating system of claim 1, further comprising fluid channeling means positioned in the through passage between the constricted zone and the outlet, the channeling means being arranged to constrict the flow of fluid towards the outlet and thus further to decrease the pressure of the fluid.

6. The fluid operated power generating system of claim 1, wherein the channeling means is arranged to provide a constricted fluid flow passage flaring outwardly towards the outlet.

7. The fluid operated power generating system of claim 5, wherein the constricted zone is at the inlet and the rotary device is mounted in the inlet.

8. The fluid operated power generating system of claim 1, further comprising valve means for regulating fluid flow between the one bore and the conduit means.

* * * * *